United States Patent
Podtchereniaev et al.

(10) Patent No.: US 6,502,410 B2
(45) Date of Patent: Jan. 7, 2003

(54) NONFLAMMABLE MIXED REFRIGERANTS (MR) FOR USE WITH VERY LOW TEMPERATURE THROTTLE-CYCLE REFRIGERATION SYSTEMS

(75) Inventors: Oleg Podtchereniaev, Novato, CA (US); Mikhail Boiarski, Macungie, PA (US); Tamirisa Apparao, Freemont, CA (US); Kevin Flynn, Novato, CA (US); Boris Yudin, Grand Island, NY (US); Vladimir Mogarichni, Moscow Region (RU)

(73) Assignee: IGC-Polycold Systems, Inc., Petaluma, CA (US)

( * ) Notice: Subject to any disclaimer, the term of this patent is extended or adjusted under 35 U.S.C. 154(b) by 0 days.

(21) Appl. No.: 09/894,968

(22) Filed: Jun. 28, 2001

(65) Prior Publication Data

US 2002/0040584 A1 Apr. 11, 2002

Related U.S. Application Data

(63) Continuation-in-part of application No. 09/728,501, filed on Nov. 30, 2000

(60) Provisional application No. 60/214,562, filed on Jun. 28, 2000, provisional application No. 60/214,565, filed on Jun. 28, 2000, and provisional application No. 60/295,237, filed on Jun. 1, 2001.

(51) Int. Cl.[7] .................................................. F25B 1/00
(52) U.S. Cl. ................................................ 62/114; 252/69
(58) Field of Search .......................... 62/114, 335, 277; 252/67, 69

(56) References Cited

U.S. PATENT DOCUMENTS 5,644,502 A * 7/1997 Little ........................ 364/496
6,306,803 B1 * 10/2001 Tazaki ....................... 508/539

* cited by examiner

Primary Examiner—William C. Doerrler
Assistant Examiner—Malik N. Drake
(74) Attorney, Agent, or Firm—Katten Muchin Zavis Rosenman

(57) ABSTRACT

Refrigerants containing HCFC's are replaced with new blends by using R-236fa and R-125, or R-125 with R-245fa, or R-236ea, or R-134a with R-236fa in place of HCFC's. No hardware or oil composition changes are required to maintain temperatures, pressures and capacity substantially unchanged in a refrigeration system.

43 Claims, 9 Drawing Sheets

Table 1. Example blends for Polycold models. Percentage by mole for refrigerant mixture being circulated by compressor system.

|  | Molar composition (percent) of the overall refrigerant mixture used in representative models | | | | |
| --- | --- | --- | --- | --- | --- |
|  | Blend A | Blend B | Blend C | Blend D | Overall range (mole %) |
| Model number | PFC-1102 HC | PFC-662 HC | PFC-552 HC | PGC-152 |  |
| Minimum temperature achieved | -133 C | -150 C | -150 C | -133 C |  |
| Refrigerant Component |  |  |  |  |  |
| Argon | 13 | 24 | 18 | 8 | 4 – 36 |
| R-14 | 34 | 26 | 35 | 24 | 10 – 55 |
| R-23 | 28 | 22 | 21 | 32 | 10 – 50 |
| R-125 | 11 | 11 | 12 | 11 | 5 – 20 |
| R-236fa | 14 | 17 | 14 | 25 | 7 - 40 |

Table 3: MR formulation for minimal temperature down to 105 K

|  | Ingredient Name | Range (% by mole) |
| --- | --- | --- |
| 1 | At least one of neon (Ne) or helium (He) | 0.0 – 10.0 |
| 2 | At least one of argon (Ar) or nitrogen (N2) | 10.0 – 45.0 |
| 3 | R-14 (CF4) | 20.0 – 50.0 |
| 4 | R-23 (CHF3) | 10.0 – 30.0 |
| 5 | R-125 (C2HF5) | 8.0 – 15.0 |
| 6 | R-134a | 0.0 – 5.0 |
| 7 | Other high boiling components: at least one of R-236fa, E-347, R-245fa, R-4112 | 0.0 – 3.0 |

Fig. 6

Table 2. Comparison of performance provided by two new blends without HCFC's compared with prior blends containing HCFC's.

| Parameter | Blend containing HCFC's (replaced by Blend A) PFC-1100 HC | | Blend A 1102 HC | | Blend containing HCFC's (replaced by Blend D) PGC-150 | | Blend D PGC-150 | |
|---|---|---|---|---|---|---|---|---|
| | Min. Load (150 W) | Max. Load (3600 W) | Min. Load (150 W) | Max. Load (3600 W) | No Flow | Max. Flow | No Flow | Max. Flow |
| Evaporator Inlet Temp. C | -134 | -108 | -135 | -109 | No data | -120 | No data | -118 |
| Evaporator Outlet Temp. C | -128 | -97 | -134 | -91 | No data | -108 | No data | -106 |
| Compressor Discharge Temp. C | 105 | 124 | 102 | 114 | 100 | 110 | 102 | 110 |
| Liquid Line Temp. C | 24 | 27 | 25 | 25 | 25 | 28 | 22 | 27 |
| Compressor Suction Temp. C | -4 | 7 | 13 | 14 | 10 | 14 | 16 | 23 |
| Compressor Current, A | 12.5 | 20 | 13 | 20 | 8.6 | 9.6 | 8.0 | 9.1 |
| Voltage, V | 460 | 460 | 460 | 460 | 230 | 230 | 230 | 230 |
| Discharge Pressure, psig | 161 | 350 | 205 | 365 | 180 | 240 | 185 | 255 |
| Suction Pressure, psig | 15 | 44 | 25 | 46 | 18 | 27 | 22 | 32 |
| Gas Inlet Temp., C | NA | NA | NA | NA | 25 | 25 | 25 | 25 |
| Gas Flow Rate, SCFH | NA | NA | NA | NA | 0 | 450 | 0 | 450 |
| Gas Outlet Temp. C | NA | NA | NA | NA | NA | -115 | NA | -115 |

Table 4: MR formulation for minimal temperature down to 118 K

|   | Ingredient Name | Range (% by mole) |
|---|---|---|
| 1 | At least one of argon (Ar) or nitrogen (N2) | 10.0 – 40.0 |
| 2 | R-14 | 20.0 – 50.0 |
| 3 | R-23 | 10.0 – 40.0 |
| 4 | R-125 | 0.0 – 35.0 |
| 5 | R-134a | 0.0 – 10.0 |
| 6 | At least one of E-347, R-4112, R-236fa, R-245fa. | 0.0 – 6.0 |

Table 5: MR formulation for minimal temperature above 130 K

|   | Ingredient Name | Range (% by mole) |
|---|---|---|
| 1 | At least one of argon (Ar) or nitrogen (N2) | 2.0 – 40.0% |
| 2 | R-14 | 10.0 – 50.0% |
| 3 | R-23 | 10.0 – 40.0% |
| 4 | R-125 | 0.0 – 430.0% |
| 5 | R-134a | 0.0 – 15.0% |
| 6 | At least one of R-245fa, R-236fa, or E-347, or R-4112. | 0.0 – 10.0% |

FIG. 8

Table 6: MR formulation for minimal temperature above 140 K

|   | Ingredient Name | Range (% by mole) |
|---|---|---|
| 1 | At least one of argon (Ar) or nitrogen (N2) | 2.0 – 40.0% |
| 2 | R-14 | 10.0 – 50.0% |
| 3 | R-23 | 10.0 – 40.0% |
| 4 | R-125 | 0.0 – 30.0% |
| 5 | R-134a | 0.0 – 15.0% |
| 6 | At least one of R-236fa, R-245fa, or E-347 or R-4112. | 0.0 – 10.0% |

Table 7: MR formulation for minimal temperature above 155 K

|   | Ingredient Name | Range (% by mole) |
|---|---|---|
| 1 | At least one of argon (Ar) or nitrogen (N2) | 0.0 - 40.0% |
| 2 | R-14 | 5.0 - 50.0% |
| 3 | R-23 | 5.0 - 40.0% |
| 4 | R-125 | 0.0 - 40.0% |
| 5 | R-134a | 0.0 – 30.0 % |
| 6 | At least one of R-236fa or R-245fa. | 0.0 – 30.0% |
| 7 | E-347 or R-4112. | 0.0 – 20.0% |

Table 8: Freeze out Temperature for Selected Blends
Experimental Data of mixed refrigerant composition flowing through the evaporator
Note: ($T_{MIN}$) is the minimal achieved temperature without freeze out.

| No. | $T_{FR}$, K ($T_{MIN}$), K | Blend Composition: Mole % | | | | | | |
|---|---|---|---|---|---|---|---|---|
|   |   | Ar | R-14 | R-23 | R-125 | R-134a | R-236fa | R-4112 | Ne |
| 1 | (113) * | 24.2 | 46.8 | 12.5 | 14.5 |   |   |   |   |
| 2 | (116-117) | 41.0 | 32.0 | 18.0 | 9.0 |   |   |   |   |
| 3 | (115-16) | 14.0 | 29.0 | 48.5 |   |   |   |   | 8.5 |
| 4 | 115-116 | 33.0 | 23.0 | 39.0 |   |   |   |   | 5.0 |
| 5 | 118-120 | 27.0 | 39.0 | 14.0 | 14.0 |   | 6.0 |   |   |
| 15 | 116-117 | 25.0 | 27.0 | 17.0 | R-218-18.0 |   |   |   | 13.0 |
| 6 | 115 | 15.0 | 22.0 | 37.0 | 24.2 | 0.0 | 1.8 |   |   |
| 7 | 116-117 | 15.0 | 22.0 | 35.7 | 23.3 | 1.5 | 2.5 |   |   |
| 8 | 120 | 17.3 | 20.0 | 33.0 | 21.5 | 3.7 | 5.3 |   |   |
| 9 | 130 | 19.0 | 22.0 | 27.5 | 19.5 | 3.0 | 9.0 |   |   |
| 10 | 125-127 | 15.2 | 19.3 | 31.5 | 21.0 | 3.5 | 9.5 |   |   |
| 11 | 153 | 29.0 | 40.0 |   |   | 9.4 | 17.0 | 4.6 |   |
| 12 | 155 | 32.3 | 47.0 |   |   | 5.6 | 11.7 | 3.4 |   |
| 13 | 170 | 32.7 | 49.1 |   |   |   | 10.3 | 7.9 |   |
| 14 | 135-137 | 24.0 | 25.0 | 23.0 | --- | 12.5 | 15.5 |   |   |

Fig. 11

Table 9 Freezing temperatures for pure and mixed refrigerants with a residual oil LT-32

| Blend | Refrigerant | Composition (% by weight); Refrigerant% / Oil LT-32% | Freezing temp, K |
|---|---|---|---|
| 1 | Pure: R-23 | 94.9% / 5.1% | 166.7 |
| 2 | Pure: R-125 | 95.5% / 4.5% | 169.6 |
| 3 | Pure: R-218 | 96.3% / 3.7% | 164.8 |
| 4 | Pure: R-218 | 97.9% / 2.1% | 150.3 |
| 5 | MR: R-14/R-23/R-125 | 96.6% / 3.4% | 167.4 |
| 6 | MR: Ar/R-14/R-23/R-125/R-236fa | 99.0% / 1.0% | 150.0 |

Fig. 12

NONFLAMMABLE MIXED REFRIGERANTS (MR) FOR USE WITH VERY LOW TEMPERATURE THROTTLE-CYCLE REFRIGERATION SYSTEMS

This application claims the benefit of provisional applications No. 60/214,562, 60/214,565 and 60/295,237, filed Jun. 28, 2000, and Jun. 1, 2001 and now pending, and is a continuation in part of U.S. patent application Ser. No. 09/728,501 filed Nov. 30, 2000, which is incorporated herein by reference.

BACKGROUND OF THE INVENTION

This invention is directed to the use of a nonflammable, nontoxic, chlorine free refrigerant mixture for use in very low temperature refrigeration systems.

Refrigeration systems have been in existence since the early 1900s, when reliable sealed refrigeration systems were developed. Since that time, improvements in refrigeration technology have proven their utility in both residential and industrial settings. In particular, low-temperature refrigeration systems currently provide essential industrial functions in biomedical applications, cryoelectronics, coating operations, and semiconductor manufacturing applications.

Providing refrigeration at temperatures below 223 K (−50 C.) have many important applications, especially in industrial manufacturing and test applications. This invention relates to refrigeration systems which provide refrigeration at temperatures between 223 K and 73 K (−50 C. and −200 C.). The temperatures encompassed in this range are variously referred to as low, ultra low and cryogenic. For purposes of this application the term "very low" or "very low temperature" will be used to mean the temperature range of 223 K and 73 K (−50 C. and −200 C.). In many manufacturing processes conducted under vacuum conditions, and integrated with a very low temperature refrigeration system, rapid heating is required for some elements. This heating process is a defrost cycle. The heating warms the evaporator and connecting refrigerant lines to room temperature. This enables these parts of the system to be accessed and vented to atmosphere without causing condensation of moisture from the air on these parts. The longer the overall defrost cycle and subsequent resumption of producing very low temperature temperatures, the lower the throughput of the manufacturing system. Enabling a quick defrost and a quick resumption of the cooling of the cryosurface (evaporator) in the vacuum chamber is beneficial to increase the throughput of the vacuum process.

There are many vacuum processes which have the need for such very low temperature cooling. The chief use is to provide water vapor cryopumping for vacuum systems. The very low temperature surface captures and holds water vapor molecules at a much higher rate than they are released. The net effect is to quickly and significantly lower the chamber's water vapor partial pressure. This process of water vapor cryopumping is very useful for many physical vapor deposition processes in the vacuum coating industry for electronic storage media, optical reflectors, metallized parts, semiconductor devices, etc. This process is also used for remove moisture from food products in freeze drying operations.

Another application involves thermal radiation shielding. In this application large panels are cooled to very low temperatures. These cooled panels intercept radiant heat from vacuum chamber surfaces and heaters. This can reduce the heat load on surfaces being cooled to lower temperatures than the panels. Yet another application is the removal of heat from objects being manufactured. In some applications the object is an aluminum disc for a computer hard drive, a silicon wafer for the manufacture of a semiconductor device, or the material such as glass or plastic for a flat panel display. In these cases the very low temperature provides a means for removing heat from these objects more rapidly, even though the object's final temperature at the end of the process step may be higher than room temperature. Further, some applications involving, hard disc drive media, silicon wafers, or flat panel display material, or other substrates, involve the deposition of material onto these objects. In such cases heat is released from the object as a result of the deposition and this heat must be removed while maintaining the object within prescribed temperatures. Cooling a surface like a platen is the typical means of removing heat from such objects. In all these cases an interface between the refrigeration system and the object to be cooled is proceeding in the evaporator where the refrigerant is removing heat from the object at very low temperatures.

Still other applications of very low temperatures include the storage of biological fluids and tissues, control of reaction rates for chemical processes and pharmaceutical processes.

Conventional refrigeration systems have historically utilized chlorinated refrigerants, which have been determined to be detrimental to the environment and are known to contribute to ozone depletion. Thus, increasingly restrictive environmental regulations have driven the refrigeration industry away from chlorinated fluorocarbons (CFCs) to hydrochloro fluorocarbons (HCFCs). Provisions of the Montreal Protocol require a phase out of HCFC's and a European Union law bans the use of HCFCs in refrigeration systems as of Jan. 1, 2001. Therefore the development of an alternate refrigerant mixture is required. Hydroflurocarbon (HFC) refrigerants are good candidates which are nonflammable, have low toxicity and are commercially available. The use of HFC's in commercial and residential applications is now well known. However, these applications do not require the typical HFC refrigerants to be used at very low temperature. Therefore their performance and behavior in a mixture at low temperature is not known.

When selecting replacement refrigerants, the use of nonflammable, nontoxic (permissible exposure limit greater than 400 ppm) is preferred.

Prior art very low temperature systems used flammable components to manage oil. The oils used in very low temperature systems using chlorinated refrigerants had good miscibility with the warmer boiling components which are capable of being liquefied at room temperature when pressurized. Colder boiling HFC refrigerants such as R-23 are not miscible with these oils and do not readily liquefy until colder parts of the refrigeration process. This immiscibility causes the compressor oil to separate and freezeout which leads to system failure due to blocked tubes, strainers, valves or throttle devices. To provide miscibility at these lower temperatures, ethane was added to the refrigerant mixture. Unfortunately, ethane is flammable and can limit customer acceptance and can invoke additional requirements for system controls, installation requirements and cost. Therefore, elimination of any flammable component is preferred.

In addition, use of a toxic refrigerant can limit customer acceptance and can invoke additional requirements for system controls, installation requirements and cost. A permissible exposure limit (PEL) is the maximum amount or concentration of a chemical that a worker may be exposed to under OSHA regulations. In the case of mixed refrigerants, a PEL of any component below 400 ppm is considered toxic and poses a health risk to any individual, such as a service technician, that may be exposed to the refrigerant. Therefore it is beneficial to use a refrigerant whose components have a PEL that is greater than 400 ppm.

Another requirement is to develop a mixture of refrigerants that will not freezeout from the refrigerant mixture. A "freezeout" condition in a refrigeration system is when one or more refrigerant components, or the compressor oil, becomes solid or extremely viscous to the point where it does not flow. During normal operation of a refrigeration system, the suction pressure decreases as the temperature decreases. If a freezeout condition occurs the suction pressure tends to drop even further creating positive feedback and further reducing the temperature, causing even more freezeout. What is needed is a way to prevent freezeout in an MR refrigeration system. HFC refrigerants available have warmer freezing points than the HCFC and CFC refrigerants that they replace. Since these refrigerants are rather new and since their use at very low temperatures is uncommon there is no body of information that can predict the freezeout behavior of mixtures containing these new refrigerants.

Another challenge when using hydroflourocarbons (HFCs) is that these refrigerants are immiscible in alkylbenzene oil and therefore, a polyolester (POE) (1998 ASHRAE Refrigeration Handbook, chapter 7, page 7.4, American Society of Heating, Refrigeration and Air Conditioning Engineers) compressor oil is used to be compatible with the HFC refrigerants. Selection of the appropriate oil is essential for very low temperature systems because the oil must not only provide good compressor lubrication, they also must not separate and freezeout from the refrigerant at very low temperatures.

Typically, in the refrigeration industry, a change in refrigerants requires a change in hardware elements such as the compressor or valves. As a result, a refrigerant change can cause expensive equipment retrofit and associated down time. What is needed is a way to use existing refrigeration equipment in combination with the recently developed HFC mixed refrigerants that are compatible with the existing hardware and materials. This is further complicated by the fact that very low temperature systems must operate in several different modes. Even the start up process on these systems can be challenging since many of the refrigerants that are liquid during steady state operation are in a gaseous state when the system is at room temperature. Further, severe operational changes such as providing rapid defrost require proper refrigerant blending for the system to operate without exceeding limits on operating temperatures or pressures. The individual developed blends in accordance with the invention are shown in Table I (FIG. 1) and indicated as Blend A, Blend B, etc. Also shown in the table are the model numbers of developed commercial products IGC Polycold Systems, Inc., San Rafael, Calif. which use these blends.

For example, a prior art refrigeration unit, used a mixture, containing R-123, R-22, R-23, R-170, R-14, and argon, which mixture has been successfully replaced with Blend A (Table I) to achieve the goal of providing equivalent refrigerant performance without using HCFC's and without using flammable or toxic refrigerants.

Further, in accordance with the invention, another component may be added to the above compositions provided that the ratios of the listed components (Table I) remain in the same proportions relative to each other.

BACKGROUND PATENTS

U.S. Pat. No. 6,041,621, "Single circuit cryogenic liquefaction of industrial gas," assigned to Praxair Technology, Inc. (Danbury, Conn.), describes a method for more efficiently liquefying industrial gas wherein refrigeration for the liquefaction is generated using a defined multi-component refrigerant fluid and provided by a single flow circuit over a wide temperature range from ambient to cryogenic temperature.

U.S. Pat. No. 5,702,632, "Non-CFC refrigerant mixture," assigned to General Signal Corporation (Stamford, Conn.), describes a refrigeration heat exchanger section useful in circulating a substantially non-CFC refrigerant mixture which comprises: a compressor means, an auxiliary condenser, a first condenser, a second condenser, a third condenser, a subcooler and a liquid/gas separator, wherein a subcooled refrigerant liquid mixture taken as bottoms from the liquid/gas separator is distributed and expanded by a first expansion means and a second expansion means to form first and second expanded streams, respectively, such that the first expanded stream is returned to the auxiliary condenser and compressor in order to avoid overheating of the compressor.

U.S. Pat. No. 5,408,848, "Non-CFC auto-cascade refrigeration system," assigned to General Signal Corporation (Stamford, Conn.), describes a refrigeration heat exchanger section useful in circulating a substantially non-CFC refrigerant mixture which comprises: a compressor means, an auxiliary condenser, a first condenser, a second condenser, a third condenser, a subcooler and a liquid/gas separator, wherein a subcooled refrigerant liquid mixture taken as bottoms from the liquid/gas separator is distributed and expanded by a first expansion means and a second expansion means to form first and second expanded streams, respectively, such that the first expanded stream is returned to the auxiliary condenser and compressor in order to avoid overheating of the compressor.

SUMMARY OF THE INVENTION

The present invention is a nonflammable, chlorine-free, nontoxic, mixed refrigerant (MR) for use with very low temperature throttle-cycle refrigeration systems of various configurations.

The nonflammable, chlorine-free, nontoxic, MR of the present invention is for use in very low temperature refrigeration system or process, such as a mixed-refrigerant system, an auto-refrigerating cascade cycle, a Kleemenko cycle, or a single expansion device system. The refrigeration system is comprised of at least one compressor and a throttle cycle of either a single (no phase separators) or multi stage (at least one phase separator) arrangement. Multi stage throttle cycles are also referred to as auto-refrigerating cascade cycles and are characterized by the use of at least one refrigerant vapor-liquid phase separator in the refrigeration process.

The nonflammable, chlorine-free, nontoxic, MR mixture of the present invention is useful in a refrigeration system having an extended defrost cycle.

An advantage of the present invention is that nonflammable, nontoxic, and chlorine free refrigerant mixtures are disclosed for use in very low temperature refrigeration ystems.

A further advantage of this invention is that the appropriate compressor oil for use with HFC refrigerants for use in very low temperature refrigeration systems are disclosed.

Yet another advantage of the invention is that the limits of warm-freezing refrigerants are identified so that the use at these mixtures below the freezing point of said warm-freezing components is disclosed.

Accordingly, an object of the invention was development of improved refrigerant blends which are free of HCFC's and which can be used to provide the same refrigeration performance as a previous blend with HCFC's without requiring changes in the compressor, refrigerant liquid-vapor phase separators, throttle devices and heat exchanger arrangement.

The invention accordingly comprises blends of refrigerants, and the appropriate compressor oil possessing the characteristics, properties and the relation of components which are exemplified in the blends herein-after described, and the scope of the invention will be indicated in the claims.

Still other objects and advantages of the invention will be apparent in the specification.

The invention accordingly comprises the features of construction, combinations of elements, and arrangements of parts, which will be exemplified in the constructions hereinafter set forth, and the scope of the invention will be indicated in the claims.

BRIEF DESCRIPTION OF THE DRAWINGS

For better understanding of the invention, reference is had to the following description taken in connection with the accompanying drawings, in which:

FIG. 4 is Table 1 of refrigerant blend compositions in accordance with the invention;

FIG. 5 is Table 2 of comparative refrigeration system performance using refrigerant blends in accordance with the invention;

FIG. 6 is Table 3 of refrigerant blends that can be used to achieve refrigeration down to 105 K without refrigerant freezeout in accordance with the invention;

FIG. 7 is Table 4 of refrigerant blends that can be used to achieve refrigeration down to 118 K without refrigerant freezeout in accordance with the invention;

FIG. 8 is Table 5 of refrigerant blends that can be used to achieve refrigeration down to 130 K without refrigerant freezeout in accordance with the invention;

FIG. 9 is Table 6 of refrigerant blends that can be used to achieve refrigeration down to 140 K without refrigerant freezeout in accordance with the invention;

FIG. 10 is Table 7 of refrigerant blends that can be used to achieve refrigeration down to 155 K without refrigerant freezeout in accordance with the invention;

FIG. 11 is Table 8 of refrigerant blends that were tested to determine the limits used in Tables 3–7 without refrigerant freezeout, in accordance with the invention;

FIG. 12 is Table 9 of the temperatures that individual refrigerants and refrigerant blends, can be combined with compressor oil without refrigerant or oil freezeout in accordance with the invention.

DESCRIPTION OF PREFERRED EMBODIMENTS

Figure 1:
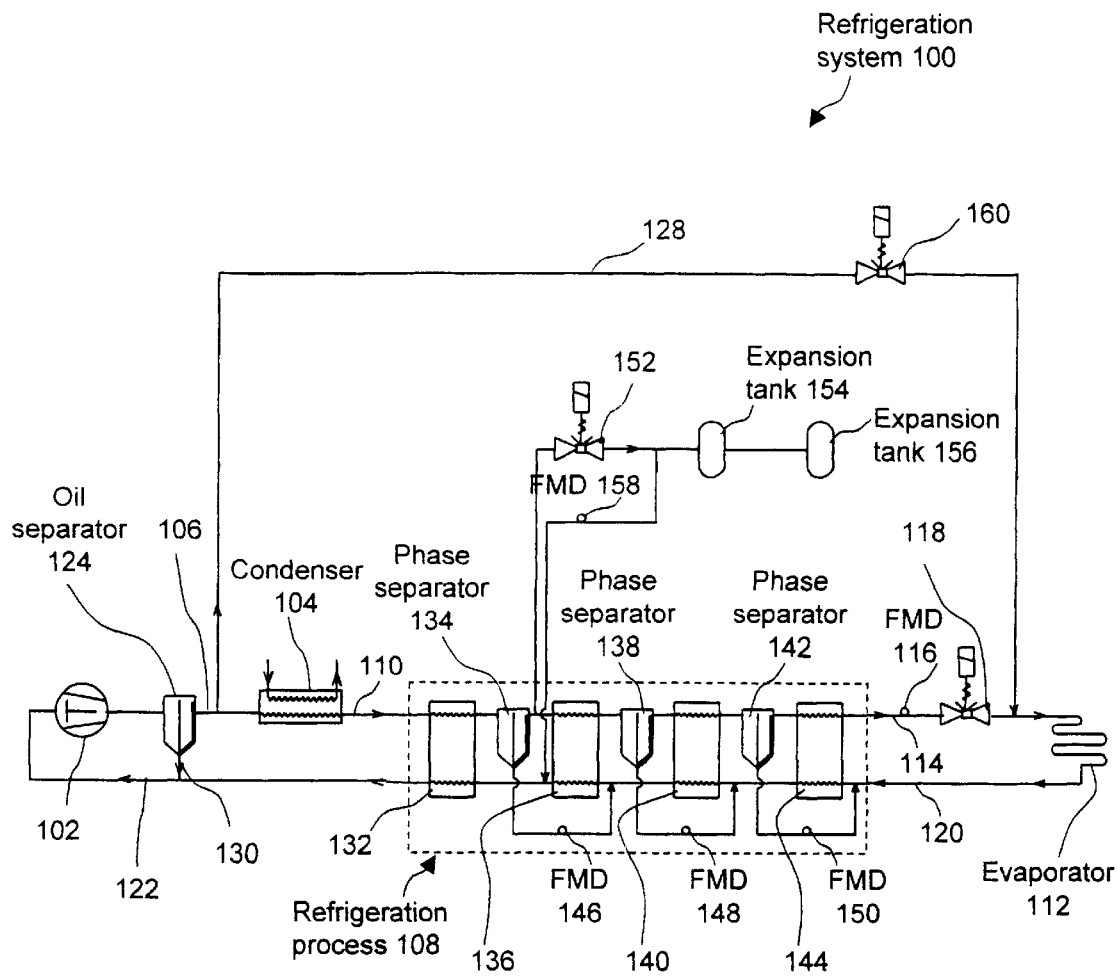
FIG. 1 is a schematic of a very low temperature refrigeration system with defrost capability, using an autorefrigerating cascade refrigeration process, operable without hardware modifications using a refrigerant blend in accordance with the invention.

In a first embodiment, FIG. 1 shows a very low temperature refrigeration system 100 which uses the mixed refrigerant in accordance with the invention. Refrigeration system 100 is a very low temperature refrigeration system that includes a compressor 102 feeding an optional oil separator 124 which feeds condenser 104 via a discharge line 106. A second outlet of oil separator 124 feeds back to compressor suction line 122 at a node between refrigeration process 108 and compressor 102 via an oil return line 130. Condenser 104 feeds a supply inlet of a refrigeration process 108 via a liquid line 110. A supply outlet of a refrigeration process 108 feeds an inlet of an evaporator 112 via a refrigerant supply line 114. In line in refrigerant supply line 114 between refrigeration process 108 and evaporator 112 is a flow metering device (FMD) 116 which in turn feeds solenoid valve 118. An outlet of evaporator 112 feeds a return inlet of refrigeration process 108 via a refrigerant return line 120. A return outlet of refrigeration process 108 closes the loop back to compressor 102 via a compressor suction line 122. In other arrangements solenoid valve 118 is located between the outlet of refrigeration process 108 and the flow metering device 116.

Refrigeration system 100 further includes a defrost supply line 128 which feeds solenoid valve 160 which delivers refrigerant at a node between solenoid valve 118 and evaporator 112.

Oil separator 124 is not needed if an oil free compressor is used. Also, in some cases the oil concentration in the discharge line exiting the compressor is low enough that an oil separator is not needed. In other variations, the oil separator is installed in defrost supply line 128.

Evaporator 112, as shown, is sometimes incorporated as part of the complete refrigeration system 100. In other arrangements evaporator 112 is provided by the customer or other third parties and is assembled upon installation of the complete refrigeration system 100. Fabrication of evaporator 112 is oftentimes very simple and may consist of copper or stainless steel tubing. The main invention is embodied by the specification of the other parts of refrigeration system 100.

Another element common in the construction of the invention are connecting lines enabling evaporator 112 to be located at considerable distance, typically 6 ft to 100 ft away from the other elements of refrigeration system 100. The connecting lines are not shown as a separate element.

Refrigeration process 108 is shown as an auto-refrigerating cascade system and includes a heat exchanger 132, a phase separator 134, a heat exchanger 136, a phase separator 138, a heat exchanger 140, a phase separator 142, a heat exchanger 144, a flow metering device (FMD) 146, an FMD 148, and an FMD 150. The heat exchangers provide heat transfer from the high pressure refrigerant to the low pressure refrigerant. The FMD's throttle the high pressure refrigerant to low pressure and create a refrigeration effect as a result of the throttling process.

The supply refrigerant flow path through refrigeration process 108 is as follows: a supply inlet of heat exchanger 132 is fed by liquid line 110 and a supply outlet of heat exchanger 132 feeds a supply inlet of phase separator 134. A supply outlet of phase separator 134 feeds a supply inlet of heat exchanger 136 and a supply outlet of heat exchanger 136 feeds a supply inlet of phase separator 138. A supply outlet of phase separator 138 feeds a supply inlet of heat exchanger 140 and a supply outlet of heat exchanger 140 feeds a supply inlet of phase separator 142. A supply outlet of phase separator 142 feeds a supply inlet of heat exchanger 144 and a supply outlet of heat exchanger 144 feeds refrigerant supply line 114.

The return refrigerant flow path through refrigeration process 108 is as follows: a return inlet of heat exchanger 144 is fed by refrigerant return line 120 and a return outlet of heat exchanger 144 feeds a return inlet of heat exchanger 140. A return outlet of heat exchanger 140 feeds a return inlet of heat exchanger 136. A return outlet of heat exchanger 136 feeds a return inlet of heat exchanger 132. A return outlet of heat exchanger 132 feeds suction line 122.

Additionally, a second outlet of phase separator 134 feeds FMD 146 which feeds into the refrigerant return path at a node between heat exchanger 136 and heat exchanger 140. A second outlet of phase separator 138 feeds FMD 148 which feeds into the refrigerant return path at a node between heat exchanger 140 and heat exchanger 144. Likewise, a second outlet of phase separator 142 feeds feeds FMD 150 which feeds into refrigerant return line 120 at a node between heat exchanger 144 and evaporator 112.

In each case phase separators 134, 138, and 142, act to separate the liquid refrigerant from the vapor refrigerant. Separation efficiencies vary from 40% to 100% (that is anywhere from 60% to 0% of the liquid may exit through the first outlet). The first outlet is preferentially vapor. The second outlet is selectively liquid. The liquid from each phase separator is expanded by a throttling device, typically a capillary tube, identified as a flow metering device (FMD). More specifically, liquid from phase separator 134 feeds FMD 146, liquid from phase separator 138 feeds FMD 148 and phase separator 143 feeds FMD 150. Therefore the liquid is at high pressure when exiting phase separators 134, 138, and 142 and at low pressure when mixed with returning low pressure refrigerant.

Refrigeration system 100 further includes a solenoid valve 152 fed by a branch of the first outlet of phase separator 134. An outlet of solenoid valve 152 feeds an expansion tank 154 connected in series with a second expansion tank 156. Additionally, an inlet of an FMD 158 connects at a node between solenoid valve 152 and expansion tank 154. An outlet of FMD 158 feeds into the refrigerant return path at a node between heat exchanger 136 and heat exchanger 132.

Refrigeration system 100 can operate in one of three modes, cool, defrost and standby. The described refrigerant mixtures enables operation in each of these three modes. If solenoid valves 160 and 118 are both in the closed position, the system is said to be in standby. No refrigerant flows to the evaporator. Refrigerant flows only within the refrigeration process 108 by means of the internal flow metering devices (i.e., FMD 146, FMD 148, and FMD 150) which cause high pressure refrigerant to be delivered to the low pressure side of the process. This permits continuous operation of the refrigeration process 108 that can continue indefinitely. In the case where a single throttle refrigeration process is used, a standby mode of operation is only possible if a means of causing flow to go through a throttle is available during the standby mode to cause the refrigerant to flow from the high pressure side to the low pressure side of the refrigeration process 108. In some arrangements this can be enabled by a pair of solenoid valves to control the flow of refrigerant to the evaporator or back to the refrigeration process. In other arrangements an additional throttle and a solenoid valve are used to enable this internal flow in standby.

By opening solenoid valve 118 the system is in the cool mode. In this mode of operation solenoid valve 160 is in the closed position. Very low temperature refrigerant from the refrigeration process 108 is expanded by FMD 116 and flows through valves 118 and out to the evaporator 112 and is then returned to refrigeration process 108 via refrigerant return line 120. Refrigeration system 100 can operate indefinitely in this mode.

Refrigeration system 100 is in the defrost mode by opening solenoid valve 160. In this mode of operation solenoid valve 118 is in the closed position. In defrost mode hot gas from compressor 102 is supplied to evaporator 112. Typically defrost is initiated to warm the surface of evaporator 112 to room temperature for the purpose of removing accumulated condensed water vapor (i.e., ice), to prevent condensation on the surface of evaporator 112 when the vacuum chamber is vented to atmosphere, or to eliminate personnel exposure hazards to the very low temperatures. Hot refrigerant flows through the oil separator 124, to solenoid valve 160 via defrost line 128, is supplied to a node between solenoid valve 118 and evaporator 112 and flows to evaporator 112. In the beginning of defrost, evaporator 112 is at very low temperature and causes the hot refrigerant gas to be cooled and fully or partially condensed. The refrigerant then returns to the refrigeration process 108 via refrigerant return line 120. The returning defrost refrigerant is initially at very low temperature quite similar to the temperatures normally provided in the cool mode. As the defrost process progresses evaporator 112 is warmed. Ultimately the temperature of the returning defrost gas is much warmer than provided in the cool mode. This results in a large thermal load on refrigeration process 108. This can be tolerated for brief periods of time, typically 2–7 minutes which is typically sufficient for warming the entire surface of evaporator 112 to room temperature. Typically a temperature sensor, not shown, is in thermal contact to refrigerant return line 120. When the desired temperature is reached at refrigerant return line 120 the temperature sensor causes the control system (not shown) to end defrost, closing the solenoid valve 160 and putting refrigeration system 100 into standby. Typically after the completion of defrost a short period in standby, typically 5 minutes, is required to allow the refrigeration process 108 to lower its temperature before being switched into the cool mode.

Alternative means of providing defrost which enable continuous operation are possible as described in U.S. patent application Ser. No. 09/870,385.

The interconnection of all elements of refrigeration system 100 as described above is accomplished to enable refrigerant flow. All elements of refrigeration system 100 are well known in the industry (i.e., compressor 102, condenser 104, refrigeration process 108, evaporator 112, FMD 116, solenoid valve 118, oil separator 124, heat exchanger 132, phase separator 134, heat exchanger 136, phase separator 138, heat exchanger 140, phase separator 142, heat exchanger 144, solenoid valve 152, expansion tank 154, expansion tank 156, and FMD 158.). Nevertheless, some brief discussion of the elements is included below.

For the purposes of illustration in this disclosure, refrigeration process 108 of refrigeration system 100 is shown in FIG. 1 as one version of an auto-refrigerating cascade cycle. However, refrigeration process 108 of very low temperature refrigeration system 100 is any very low temperature refrigeration system, using mixed refrigerants.

More specifically, refrigeration process 108 may be the IGC-Polycold Systems (San Rafael, Calif.) auto-refrigerating cascade process, or an IGC-APD Cryogenics (Allentown, Pa.) APD system (i.e., single stage cryocooler having no phase separation), Missimer type cycle (i.e., auto-refrigerating cascade, Missimer U.S. Pat. No. 3,768, 273), Kleemenko type (i.e., two phase separator system), single phase separator system, or single expansion device type described by Longsworth's U.S. Pat. No. 5,441,658. Also refrigeration process 108 may be variations on these processes such as described in Forrest U.S. Pat. No. 4,597, 267 and Missimer U.S. Pat. No. 4,535,597, or any very low temperature refrigeration process with none, one, or more than one stages of phase separation. A further reference for low temperature and very low temperature refrigeration can be found in Chapter 39 of the 1998 ASHRAE Refrigeration Handbook produced by the American Society of Heating, Refrigeration, and Air Conditioning Engineering. In addition to the number of phase separators used, the number of heat exchangers, and the number of internal throttle devices used can be increased or decreased in various arrangements as appropriate for the specific application.

Several basic variations of refrigeration process 108 shown in FIG. 1 are possible. The refrigeration system 100 shown in FIG. 1 associates with a single compressor. However, it is recognized that this same compression effect can be obtained using two compressors in parallel, or that the compression process may be broken up into stages via compressors in series or a two stage compressor. All of these possible variations are considered to be within the scope of this disclosure. The preferred embodiment uses a single compressor since this offers improvements in reliability. Use of two compressors in parallel is useful for reducing energy consumption when the refrigeration system is lightly loaded. A disadvantage of this approach is the additional components, controls, required floor space, and cost, and reduction in reliability. Use of two compressors in series provides a means to reduce the compression ratio of each stage of compression. This provides the advantage of reducing the maximum discharge temperature reached by the compressed refrigerant gas. However, this too requires additional components, controls and costs and lowers system reliability. The preferred embodiment uses a single compressor. With a single compressor the compression of the mixed refrigerants in a single stage of compression has been successfully demonstrated without excessive compression ratios or discharge temperatures. Use of a compressor designed to provide multistage compression and which enables cooling of refrigerant between compression stages retains the benefit of separate compression stages while minimizing the disadvantages of increased complexity since a single compressor is still used.

The refrigeration system 100 shown in FIG. 1 associates with a single evaporator. A common variation is to provide independent control of defrost and cooling control to multiple evaporators. In such an arrangement the evaporators are in parallel, each having a set of valves such as 160 and 118 to control the flow of cold refrigerant or hot defrost gas, and the necessary connecting lines. This makes it possible to have one or more evaporators in the cool, defrost or standby mode, for example, while other evaporators may be independently placed in the cool, defrost or standby mode.

Refrigeration system 100 further includes a solenoid valve 152 fed by a branch from first outlet of phase separator 134. An outlet of solenoid valve 152 feeds an expansion tank 154 connected in series with a second expansion tank 156. Additionally, an inlet of an FMD 158 connects at a node between solenoid valve 152 and expansion tank 154. An outlet of FMD 158 feeds into the refrigerant return path at a node between heat exchanger 136 and heat exchanger 132.

At start up it is typical for most of the refrigerants throughout refrigeration system 100 to be in a gas state since the entire system is at room temperature. It is important to manage the refrigerant gas such that the cool down time is optimized. Selectively removing gas from circulation in refrigeration system 100 during startup would be beneficial toward this optimization. Additionally, the rate at which the gasses are bled back into refrigeration system 100 also affects the cool down rate.

The system controller (not shown) opens solenoid valve 152 briefly on startup, typically for 10 to 20 seconds. Solenoid valve 152 is, for example, a Sporlan Model B6 valve (Washington Mo.). As a result, during startup, refrigerant gas exits from phase separator 134 and feeds the series combination of expansion tank 154 and expansion tank 156. FMD 158 regulates the flow of refrigerant gas in and out of expansion tanks 154 and 156. Two considerations for setting the flow through FMD 158 is as follows: the flow must be slow enough such that the gas returning to refrigeration system 100 is condensable in the condenser at whatever operating conditions exist at any given time, thereby insuring optimized cool down. It is this initial formation of liquid during the start up process that enables cool down times on the order of 15–60 minutes. At the same time however, the rate of flow through FMD 158 must be fast enough to insure that enough refrigerant is flowing in refrigeration system 100 such that a possible shutdown due to low suction pressure is prevented. The flow of gas to and from expansion tanks 154 and 156 is controlled passively using FMD 158 as shown in FIG. 1. Alternatively, a controller in combination with sensors can be used to provide active flow control.

The arrangement of expansion tanks comprise at least one pressure vessel and could have any number or combination of expansion tanks arranged in series and or parallel.

Figure 2:
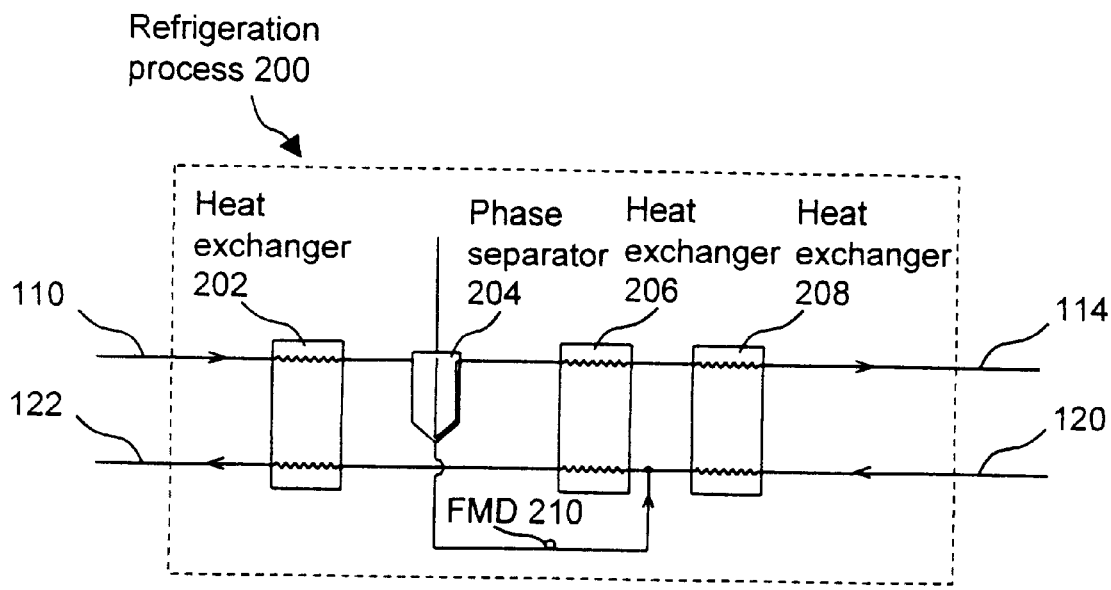
FIG. 2 is a partial schematic of an alternative refrigeration process, a single phase separator auto refrigerating cascade, for use in the refrigeration system of FIG. 1 in accordance with the invention.

FIG. 2 shows an alternative variation of refrigeration process 108 that uses the mixed refrigerant of embodiments one or two in accordance with the invention. Commonly this arrangement is referred to as a single phase separator autorefrigerating cascade process. Refrigeration process 200 of FIG. 2 includes a heat exchanger 202, a phase separator 204, a heat exchanger 206, a heat exchanger 208, and an FMD 210.

The supply refrigerant flow path through refrigeration process 200 is as follows: a supply inlet of heat exchanger 202 is fed by liquid line 110 and a supply outlet of heat exchanger 202 feeds a supply inlet of phase separator 204. A supply outlet of phase separator 204 feeds a supply inlet of heat exchanger 206 and a supply outlet of heat exchanger 206 feeds a supply inlet of heat exchanger 208. A supply outlet of heat exchanger 208 feeds refrigerant supply line 114.

The return refrigerant flow path through refrigeration process 200 is as follows: a return inlet of heat exchanger 208 is fed by refrigerant return line 120 and a return outlet of heat exchanger 208 feeds a return inlet of heat exchanger 206. A return outlet of heat exchanger 206 feeds a return inlet of heat exchanger 202. A return outlet of heat exchanger 202 feeds compressor suction line 122. Additionally, liquid from a second outlet of phase separator 204 flows through FMD 210 and into the refrigerant return path at a node between heat exchanger 206 and heat exchanger 208. The liquid is at high pressure when exiting phase separator 204 and at low pressure when mixed with returning low pressure refrigerant.

Figure 3:
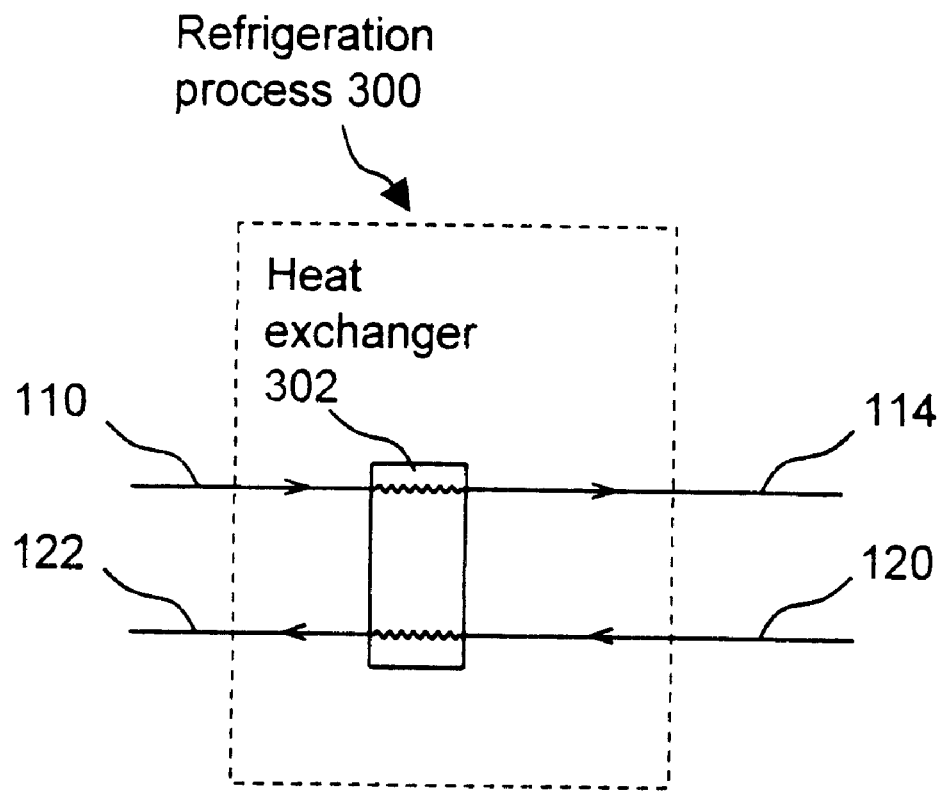
FIG. 3 is a partial schematic of another alternative refrigeration process for use in the refrigeration system of FIG. 1 in accordance with the invention.

FIG. 3 shows yet another alternative variation of refrigeration process 108 that that uses the mixed refrigerant of embodiments one or two in accordance with the invention. Refrigeration process 300 of FIG. 3 includes only a heat exchanger 302. This arrangement is referred to as a system without phase separation and is similar to the arrangement described by Longsworth, cited above.

The supply refrigerant flow path through refrigeration process 300 is as follows: a supply inlet of heat exchanger 302 is fed by liquid line 110 and a supply outlet of heat exchanger 302 feeds refrigerant supply line 114.

The return refrigerant flow path through refrigeration process 300 is as follows: a return inlet of heat exchanger 302 is fed by refrigerant return line 120 and a return outlet of heat exchanger 302 feeds compressor suction line 122.

Refrigeration process 300 requires additional components to enable a defrost or standby mode. As a minimum at least one FMD must be included to provide a return path by which high pressure refrigerant can be throttled to low pressure and thereby return to the compressor. Additional components can be added beyond this, such as a solenoid valve in series with the FMD to enable flow only in the standby mode.

Providing continuous operation of refrigeration system 100 as it is started, and is operated in the standby, defrost, and cool modes requires the proper balancing of the refrigerant components described in this disclosure. If the refrigerant blend does not have the correct components in the correct range of composition, a fault condition will be experienced which causes refrigeration system 100 to be turned off by the control system. Typical fault conditions are low suction pressure, high discharge pressure or high discharge temperature. Sensors to detect each of these conditions are required to be included in refrigeration system 100 and included in the safety interlock of the control system. It has been demonstrated that the types of components described in this application can be used to provide refrigeration at very low temperatures and that they can be used to provide operation in the cool, defrost and standby operating modes. Examples of refrigerant charges developed to provide these three modes of operation (i.e., standby, cool, and defrost modes) are listed in Table 1 (FIG. 4) as blends A, B, and C.

These refrigerants were developed for specific manufactured models of equipment which previously used mixtures comprised of HCFC components. The new refrigerant mixtures were used with the old hardware design without change. The same heat exchangers, FMD's, compressor, oil separators and phase separators were used without any required changes to the control settings of the system. The same level of refrigeration performance (heat removal) was provided as with the previous HCFC containing MR. The new HFC MR enabled start up and defrost transients without any operational difficulties. Achieving this extensive range of function without basic hardware modification required much experimental testing and evaluation.

The blends shown in Table 1 are in accordance with the invention and were developed for use in an autorefrigerating cascade refrigeration process similar to that shown in FIG. 1 with the exception of the PGC-152. All compositions shown in Table 1 are the overall blend composition as charged into each model listed.

Four different basic blends are shown in Table 1 (FIG. 4). It is expected that the ranges of compositions shown in Table 1 are applicable to the many different refrigeration cycles as mentioned. Blends A through D are examples of blends that were actually developed in autorefrigerating cascades in evaluating the present invention. Each one is a variant based on particular requirements of the refrigeration unit for which it was developed. Blends were implemented in four different commercially available refrigeration systems with minor modifications and provide cool, defrost and standby modes of operation similar to the arrangement shown in FIG. 1. Variations between the different systems are a result of slight differences in the performance specifications for each unit. Table 2 (FIG. 5) gives important system operating conditions when a refrigeration system was operated alternatively with the prior blend that contained HCFC's and then with Blend A. As evident from the data, performance is closely matched between the two blends. Another example wherein Blend C is a substitute refrigerant, is also included in Table 2.

Blend B was developed for a product providing cool, defrost and standby modes of operation similar to the arrangement shown in FIG. 1.

Blend C was also developed for a product providing cool, defrost and standby modes of operation similar to the arrangement shown in FIG. 1.

Blend D was developed for a product application that provides gas chilling. The PGC-152 is a variation of the arrangement shown in FIG. 1. The PGC-152 arrangement lacks the defrost capability provided by components 128, 160 and 116. Further the refrigeration process for the PGC-152 lacks elements 142, 144 and 150. The primary purpose of the PGC-152 is to cool a gas stream. This is accomplished by having heat exchangers 132, 136 and 140 configured as three flow heat exchangers where the gas stream flows counter current to and is cooled by the low pressure refrigerant. This precooled gas then flows counter current to the evaporator refrigerant.

Table 2 gives important system operating conditions when the system operated with a prior art blend which contained HCFC's and alternatively with Blend A. As evident from the data, performance is closely matched between the two blends. A similar comparison is presented for Blend D.

Development of a refrigerant blend which is free of HCFC's and which can be used to provide the same refrigeration performance as a previous charge which contained HCFC's, was accomplished without requiring changes in the compressor, throttle devices, refrigerant liquid-vapor phase separators, and without changes to the heat exchanger arrangement.

In addition to developing replacement refrigerant mixtures for prior art systems, new mixed refrigerant systems are being developed. Therefore the appropriate range of composition has been expanded in the column labeled overall range of Table 1, and in the claims, in light of this experience.

Further, new refrigerants have been studied to assess their performance in very low temperature refrigeration systems. The refrigerants are R-245fa, R-134a, E-347 and R-4112. R-245fa has been tested and provides similar performance as R-236fa. In addition, testing of R134a, E-347 and R-4112 indicate that these refrigerants can also be used in very low temperature refrigeration systems. Further details are provided in the discussion of tables 3–8.

It is also recognized that since the HCFC containing mixed refrigerants used R-170 (ethane) interchangeably with R-23. Therefore, R-170 can be used in place of R-23 with these new blends. Of course, use of such a flammable component will make the overall mixture flammable if the molar concentration of R-170 is above about 5% to 10%.

In an expanded group of refrigerants in accordance with the invention, an MR formulation for use with low temperature throttle-cycle refrigeration systems comprised of the ingredients listed in Tables 3 through 7, with limited ranges on various components to assure that freezeout of the refrigerant components is prevented.

Tables 3 through 7 present various ranges of compositions that work effectively to produce refrigeration down to the minimum temperature listed in the heading for each table without freezeout of any component occurring. In each case the refrigerant compositions shown are the refrigerant compositions in circulation through the evaporator coil. In the case of auto-refrigerating cascade systems the refrigerant composition circulating through the evaporator is different from the composition circulating through the compressor. This difference is due to the intentional separation of refrigerants which condense at warmer temperatures. Those skilled in the art will recognize that various methods exist to manage the difference between the refrigerant composition at the compressor and the composition at the evaporator. The key criteria is that the refrigerant composition at the evaporator be within the limits described in this application. Within these ranges the number of compositions and their performances are potentially infinite.

In Tables 3 through 7, the use of the refrigerant components R-236fa, R-245fa, R-4112 and E-347 is varied and the low end of the composition range is 0%. The preferred embodiment uses some small percentage of at least one of these refrigerants. When using these refrigerant mixtures in a system without phase separation, the maximum concentration is strictly limited to prevent freezeout conditions and is a function of the coldest evaporator temperature as described in Tables 3 through 7. When using these refrigerant mixtures in a system with phase separators the concentration of these refrigerant components can be increased above the limits shown in Tables 3 through 7 since the phase separator will reduce the concentration of these refrigerants in the refrigerant mixture flowing through the evaporator to stay within the limits listed in Tables 3 through 7. It is preferred to maximize the concentration of these refrigerant components since higher amounts of liquid will be formed in the condenser and will cause higher levels of heat rejection. This improves the overall efficiency of the refrigeration system. If these refrigerant components are eliminated from a refrigeration system, the efficiency of the system, and the ability to remove heat at the evaporator will be reduced significantly. For example, elimination of these refrigerant components from the refrigerant mixture can reduce the heat rejected in the condenser by up to about 70%. Since this limits the total amount of heat that the system can reject, the amount of heat removed by the evaporator is reduced significantly. In addition, loss of these refrigerant components causes difficulty starting a system, and causes excessively high pressure during processes such as defrost.

Further, in consideration of using R-236fa, R-245fa, R-4112 and E-347, R-236fa and R-245fa are HFC refrigerants whereas R-4112 and E-347 are not. HFC refrigerants are preferred due to their proven miscibility with POE type oils. R-4112 is fluorocarbon and is not miscible with POE oil and has a relatively high global warming potential. E-347 is an ether refrigerant. It is not readily miscible with POE oil and has a very low global warming potential. When using a compressor lubricated with a POE type oil, some use of R-236fa or R-245fa is recommended to assure good oil return to the compressor and oil/refrigerant management in the compressor. If either E-247 or R-4112 is used with an oil lubricated compressor, special evaluation is required to assure adequate oil return to the compressor is provided, and that proper lubrication of the internal compressor parts takes place, as is normal practice.

Table 8 shows sample MR formulations (Mol %) and associated Freezeout Temperature ($T_{FR}$); (Experimental Data) *) ($T_{MIN}$)–minimal achieved temperature without freeze out. Data has been obtained by testing on a very low temperature system with a single throttle as described in the Longsworth patent. This data is the basis for Table 3 through Table 7.

A related invention, disclosed by U.S. Provisional Application Ser. No. 60/214,565, uses an evaporator pressure regulating valve, installed in the compressor suction line 122, to prevent freezeout of the refrigerant components by acting to maintain at least a minimum suction pressure to the refrigeration process, thereby keeping the suction pressure of the system from dropping too low. As the suction pressure gets lower the temperature gets colder. If a freezeout condition occurs the suction pressure tends to drop creating positive feedback and further reducing the temperature, causing even more freezeout. Such a valve was used with Blends B and C of Table 1 to assure that freezeout was prevented.

With the exception of E-347, and R-4112 all refrigerants listed are designated in accordance with American Society of Heating and Refrigeration and Air Conditioning Engineering (ASHRAE) standard number 34.

E-347 is known as 1-(methoxy)-1,1,2,2,3,3,3-heptafluoropropane (also $CH_3$—O—$CF_2$—$CF_2$—$CF_3$), 3M product reference Hydrofluoroether 301. At this time a permissible exposure limit (PEL) is not yet established for this compound. Therefore it is not known if it meets the criteria of a nontoxic refrigerant (PEL>400 ppm). If it is discovered that this compound has a PEL below 400 ppm then it can be diluted with other components to produce a refrigerant mixture that has an overall PEL that is considered nontoxic.

R-4112 is known as dodecafluoropentane (also $CF_3CF_2CF_2CF_2CF_3$).

A third embodiment, in accordance with the invention, is required for a refrigeration system based on an oil-lubricated compressor operating with one of the nonflammable MR formulations of Table 3 through 8 at temperatures below 200 K. Therefore, an oil must be added to the MR formulation, in accordance with the invention. Furthermore, it is required that the oil insure long term compressor operation and avoid freeze out of the refrigerant contaminated with oil.

Compressors designed to operate with mixed refrigerants formulated of HFC components should use either polyolesters (POE) or polyalkylene glycols (PAG) type of oil to insure long term operation. A typical pour point temperature for this oil is higher then 220 K (−53 C.). Also in this temperature range oils of this type are miscible with pure and mixed refrigerants formulated of HFCs. For example, POE oil Solest LT-32 has a pour point temperature of 223 K and is fully miscible with pure R-23. Mixed refrigerants R-404a (combination of R-125, R-143a and R-134a) and R-407c (combination of R-32, R-125 and R-134a) are also fully miscible with this oil at T>223 K). Table 9 below shows sample refrigerant formulations and associated freezing temperature, pure and mixed refrigerants with residual oil LT-32 (CPI Engineering, Solest LT-32) are included.

It was found that a small amount of oil LT 32 can be mixed with the mixed refrigerants at very low temperatures without freezeout. This is shown in Table 9. This allows long term operation of the system when equipped with an oil lubricated compressor and properly sized oil separators to keep the oil concentrations below the levels shown in Table 9. Alternatively, in an auto-refrigerating cascade system, the use of phase separators in the refrigeration process can also be used to limit the concentration of oil mixed with very low temperature refrigerant flowing through the coldest parts of the system. The efficiency of the phase separators needs to be sufficiently high that the oil concentration does not exceed the limits shown in Table 9.

Other oils which exhibit similar properties are commercially available and are considered to fall within the scope of this invention.

What is claimed is:

1. Refrigerant blends not containing HCFC for use in a very low temperature refrigeration system, said refrigerant blends in mol percent comprising:

| Component | Overall range (mole %) |
|---|---|
| Argon | 4–36 |
| R-14 | 10–55 |
| R-23 | 10–50 |
| R-125 | 5–20 |
| R-236fa | 7–40 |

2. Refrigerant blends as in claim 1 and further comprising at least one additional component in each said blend, the components maintaining the same proportions relative to each other after addition of said additional component.

3. Refrigerant blends as in claim 1, wherein said refrigeration system is a compressor cycle in one of an autorefrigerating cascade having a liquid/vapor phase separator, throttle device refrigeration system, and a Klimenko type system.

4. Refrigerant blends as in claim 1 wherein said refrigerating system alternatively permits flow of cold refrigerant or flow of hot refrigerant to an evaporator.

5. Refrigerant blends not containing HCF's as in claim 1, said blends operating as a replacement in a refrigeration system to provide substantially the same thermodynamic performance in said system as provided by earlier blends of components, in said earlier blends HCF's being greater than 0 mol percent.

6. Refrigerant blends as in claim 1, wherein said refrigeration system includes an object being cooled by the refrigerant, said object being at least one of (a) a metal element in a vacuum chamber freezing out and trapping undesired gasses such as water vapor, (b) a heat exchanger removing heat from a secondary fluid stream including at least one of a liquid, gas, condensing gas, and condensing gas mixture, (c) a metal element having internal refrigerant flow passages and cooling at least one of a silicon wafer, piece of glass, plastic piece and an aluminum disc with or without a magnetic coating on it, and (d) a biological freezer to at least one of freeze and store biological tissues.

7. Refrigerant blends as in claim 1, and further comprising lubricating oil in a range of approximately 1% to 10% by weight, said oil being one of POE type and PAG type.

8. Refrigerant blends not containing HCFC's, for use in a very low temperature refrigeration system where the evaporator temperature is as low as 105 K, said refrigerant blends comprising:

| | Ingredient Name | Range (% by mol) |
|---|---|---|
| 1 | At least one of neon (Ne) or helium (He) | 0.0–10.0 |
| 2 | At least one of argon (Ar) or nitrogen (N2) | 10.0–45.0 |
| 3 | R-14 (CF4) | 20.0–50.0 |
| 4 | R-23 (CHF3) | 10.0–30.0 |
| 5 | R-125 (C2HF5) | 8.0–15.0 |
| 6 | R-134a | 0.0–5.0 |
| 7 | Other high boiling components: at least one of R-236fa, E-347, R-245fa, R-4112 | 0.0–3.0 |

9. Refrigerant blends as in claim 8 and further comprising at least one additional component in each said blend, the components maintaining the same proportions relative to each other after addition of said additional component.

10. Refrigerant blends as in claim 8, wherein said refrigeration system is a compressor cycle in one of an autorefrigerating cascade having a liquid/vapor phase separator, throttle device refrigeration system, and a Klimenko type system.

11. Refrigerant blends as in claim 8 wherein said refrigerating system alternatively permits flow of cold refrigerant or flow of hot refrigerant to an evaporator.

12. Refrigerant blends not containing HCF's as in claim 8, said blends operating as a replacement in a refrigeration system to provide substantially the same thermodynamic performance in said system as provided by earlier blends of components, in said earlier blends HCF's being greater than 0 mol percent.

13. Refrigerant blends as in claim 8, wherein said refrigeration system includes an object being cooled by the refrigerant, said object being at least one of (a) a metal element in a vacuum chamber freezing out and trapping undesired gasses such as water vapor, (b) a heat exchanger removing heat from a secondary fluid stream including at least one of a liquid, gas, condensing gas, and condensing gas mixture, (c) a metal element having internal refrigerant flow passages and cooling at least one of a silicon wafer, piece of glass, plastic piece and an aluminum disc with or without a magnetic coating on it, and (d) a biological freezer to at least one of freeze and store biological tissues.

14. Refrigerant blends as in claim 8, and further comprising lubricating oil in a range of approximately 1% to 10% by weight, said oil being one of POE type and PAG type.

15. Refrigerant blends not containing HCFC's, for use in a very low temperature refrigeration system with low temperature (evaporator) as low as 118 K, said refrigerant blends comprising:

| | Ingredient Name | Range (% by mole) |
|---|---|---|
| 1 | At least one of argon (Ar) or nitrogen (N2) | 10.0–40.0 |
| 2 | R-14 | 20.0–50.0 |
| 3 | R-23 | 10.0–40.0 |
| 4 | R-125 | 0.0–35.0 |
| 5 | R-134a | 0.0–10.0 |
| 6 | At least one of E-347, R-4112, R-236fa, R-245fa. | 0.0–6.0 | provided that at least one of E-347, R-4112, R-236fa, or R-245fa is present in the blend.

16. Refrigerant blends as in claim 15 and further comprising at least one additional component in each said blend, the components maintaining the same proportions relative to each other after addition of said additional component.

17. Refrigerant blends as in claim 15, wherein said refrigeration system is a compressor cycle in one of an autorefrigerating cascade having a liquid/vapor phase separator, throttle device refrigeration system, and a Klimenko type system.

18. Refrigerant blends as in claim 15 wherein said refrigerating system alternatively permits flow of cold refrigerant or flow of hot refrigerant to an evaporator.

19. Refrigerant blends not containing HCF's as in claim 3, said blends operating as a replacement in a refrigeration system to provide substantially the same thermodynamic performance in said system as provided by earlier blends of components, in said earlier blends HCF's being greater than 0 mol percent.

20. Refrigerant blends as in claim 15, wherein said refrigeration system includes an object being cooled by the refrigerant, said object being at least one of
   (a) a metal element in a vacuum chamber freezing out and trapping undesired gasses such as water vapor,
   (b) a heat exchanger removing heat from a secondary fluid stream including at least one of a liquid, gas, condensing gas, and condensing gas mixture,
   (c) a metal element having internal refrigerant flow passages and cooling at least one of a silicon wafer, piece of glass, plastic piece and an aluminum disc with or without a magnetic coating on it, and
   (d) a biological freezer to at least one of freeze and store biological tissues.

21. Refrigerant blends as in claim 15, and further comprising lubricating oil in a range of approximately 1% to 10% by weight, said oil being one of POE type and PAG type.

22. Refrigerant blends not containing HCFC's, for use in a very low temperature refrigeration system with low temperature (evaporator) as low as 130 K, said refrigerant blends comprising:

|   | Ingredient Name | Range (% by mole) |
|---|---|---|
| 1 | At least one of argon (Ar) or nitrogen (N2) | 2.0–40.0% |
| 2 | R-14 | 10.0–50.0% |
| 3 | R-23 | 10.0–40.0% |
| 4 | R-125 | 0.0–40.0% |
| 5 | R-134a | 0.0–15.0% |
| 6 | At least one of R-245fa, R-236fa, or E-347, or R-4112. | 0.0–30.0% | provided that at least one of R-245fa, R-236fa, E-347, or R-4112 is present in the blend.

23. Refrigerant blends as in claim 22 and further comprising at least one additional component in each said blend, the components maintaining the same proportions relative to each other after addition of said additional component.

24. Refrigerant blends as in claim 22, wherein said refrigeration system is a compressor cycle in one of an autorefrigerating cascade having a liquid/vapor phase separator, throttle device refrigeration system, and a Klimenko type system.

25. Refrigerant blends as in claim 22 wherein said refrigerating system alternatively permits flow of cold refrigerant or flow of hot refrigerant to an evaporator.

26. Refrigerant blends not containing HCF's as in claim 22, said blends operating as a replacement in a refrigeration system to provide substantially the same thermodynamic performance in said system as provided by earlier blends of components, in said earlier blends HCF's being greater than 0 mol percent.

27. Refrigerant blends as in claim 22, wherein said refrigeration system includes an object being cooled by the refrigerant, said object being at least one of
   (a) a metal element in a vacuum chamber freezing out and trapping undesired gasses such as water vapor,
   (b) a heat exchanger removing heat from a secondary fluid stream including at least one of a liquid, gas, condensing gas, and condensing gas mixture,
   (c) a metal element having internal refrigerant flow passages and cooling at least one of a silicon wager, piece of glass, plastic piece and an aluminum disc with or without a magnetic coating on it, and
   (d) a biological freezer to at least one of freeze and store biological tissues.

28. Refrigerant blends as in claim 4, and further comprising lubricating oil in a range of approximately 1% to 10% by weight, said oil being one of POE type and PAG type.

29. Refrigerant blends not containing HCFC's, for use in a very low temperature refrigeration system with low temperature (evaporator) as low as 140 K, said refrigerant blends comprising:

|   | Ingredient Name | Range (% by mol) |
|---|---|---|
| 1 | At least one of argon (Ar) or nitrogen (N2) | 2.0–40.0% |
| 2 | R-14 | 10.0–50.0% |
| 3 | R-23 | 10.0–40.0% |
| 4 | R-125 | 0.0–30.0% |
| 5 | At least one of R-236fa, R-245fa, E-347, or R-4112. | 0.0–15.0% | provided that at least one of R-236fa, R-245fa, E-347, or R-4112 is present in the blend.

30. Refrigerant blends as in claim 29 and further comprising at least one additional component in each said blend, the components maintaining the same proportions relative to each other after addition of said additional component.

31. Refrigerant blends as in claim 29, wherein said refrigeration system is a compressor cycle in one of an autorefrigerating cascade having a liquid/vapor phase separator, throttle device refrigeration system, and a Klimenko type system.

32. Refrigerant blends as in claim 29 wherein said refrigerating system alternatively permits flow of cold refrigerant or flow of hot refrigerant to an evaporator.

33. Refrigerant blends not containing HCF's as in claim 29, said blends operating as a replacement in a refrigeration system to provide substantially the same thermodynamic performance in said system as provided by earlier blends of components, in said earlier blends HCF's being greater than 0 mol percent.

34. Refrigerant blends as in claim 29, wherein said refrigeration system includes an object being cooled by the refrigerant, said object being at least one of
   (a) a metal element in a vacuum chamber freezing out and trapping undesired gasses such as water vapor,
   (b) a heat exchanger removing heat from a secondary fluid stream including at least one of a liquid, gas, condensing gas, and condensing gas mixture, (c) a metal element having internal refrigerant flow passages and cooling at least one of a silicon wafer, piece of glass, plastic piece and an aluminum disc with or without a magnetic coating on it, and a biological freezer to at least one of freeze and store biological tissues.

35. Refrigerant blends as in claim 29, and further comprising lubricating oil in a range of approximately 1% to 10% by weight, said oil being one of POE type and PAG type.

36. Refrigerant blends not containing HCFC's, for use low temperature refrigeration system with low temperature (evaporator) as low as 155 K, said refrigerant blends comprising:

|   | Ingredient Name | Range (% by mole) |
|---|---|---|
| 1 | At least one of argon (Ar) or nitrogen (N2) | 0.0–40.0% |
| 2 | R-14 | 5.0–50.0% |
| 3 | R-23 | 5.0–40.0% |
| 4 | R-125 | 0.0–40.0% |
| 5 | R-134a | 0.0–30.0% |
| 6 | At least one of R-236fa or R-245fa | 0.0–30.0% |
| 7 | At least one of E-347 or R-4112 | 0.0–20.0% | provided that at least one of R-236fa, R-245fa, E-347, or R-4112 is present in the blend.

37. Refrigerant blends as in claim 36 and further comprising at least one additional component in each said blend, the components maintaining the same proportions relative to each other after addition of said additional component.

38. Refrigerant blends as in claim 36, wherein said refrigeration system is a compressor cycle in one of an autorefrigerating cascade having a liquid/vapor phase separator, throttle device refrigeration system, and a Klimenko type system.

39. Refrigerant blends as in claim 36 wherein said refrigerating system alternatively permits flow of cold refrigerant or flow of hot refrigerant to an evaporator.

40. Refrigerant blends not containing HCF's as in claim 36, said blends operating as a replacement in a refrigeration system to provide substantially the same thermodynamic performance in said system as provided by earlier blends of components, in said earlier blends HCF's being greater than 0 mol percent.

41. Refrigerant blends as in claim 36, wherein said refrigeration system includes an object being cooled by the refrigerant, said object being at least one of (d) a metal element in a vacuum chamber freezing out and trapping undesired gasses such as water vapor, (e) a heat exchanger removing heat from a secondary fluid stream including at least one of a liquid, gas, condensing gas, and condensing gas mixture, (f) a metal element having internal refrigerant flow passages and cooling at least one of a silicon wafer, piece of glass, plastic piece and an aluminum disc with or without a magnetic coating on it, and a biological freezer to at least one of freeze and store biological tissues.

42. Refrigerant blends as in claim 36, and further comprising lubricating oil in a range of approximately 1% to 10% by weight, said oil being one of POE type and PAG type.

43. Refrigerant blends not containing HCFC for use in a very low temperature refrigeration system, said refrigerant blends selected from the group comprising Blend A, Blend B, Blend C, and Blend D where the components of each blend in mol percent are as follows:

| Component | Molar Fraction (percent) | | | |
|---|---|---|---|---|
| | Blend A | Blend B | Blend C | Blend D |
| Argon | 13 | 24 | 18 | 8 |
| R-14 | 34 | 26 | 35 | 24 |
| R-23 | 28 | 22 | 21 | 32 |
| R-125 | 11 | 11 | 12 | 11 |
| R-236fa | 14 | 17 | 14 | 25. |

* * * * *